United States Patent
Leland et al.

(10) Patent No.: US 9,872,135 B2
(45) Date of Patent: Jan. 16, 2018

(54) SYSTEMS AND METHODS FOR DISPLAYING LOCATION INFORMATION FOR RFID TAGS

(71) Applicant: INTERMEC IP CORP., Everett, WA (US)

(72) Inventors: Hunter Leland, Cedar Rapids, IA (US); Stephen J. Kelly, Marion, IA (US); Eric Chrisman, Cedar Rapids, IA (US); Pavel Nikitin, Seattle, WA (US)

(73) Assignee: INTERMEC IP CORP., Lynnwood, WA (US)

( * ) Notice: Subject to any disclaimer, the term of this patent is extended or adjusted under 35 U.S.C. 154(b) by 2 days.

(21) Appl. No.: 14/587,742

(22) Filed: Dec. 31, 2014

(65) Prior Publication Data
US 2016/0192125 A1  Jun. 30, 2016

(51) Int. Cl.
*H04W 4/02* (2009.01)
*G06K 7/10* (2006.01)
*E05B 73/00* (2006.01)

(52) U.S. Cl.
CPC .......... *H04W 4/02* (2013.01); *G06K 7/10009* (2013.01); *G06K 7/10158* (2013.01); *E05B 73/0017* (2013.01)

(58) Field of Classification Search
CPC ............ E05B 73/00171; G06K 19/045; G06K 19/0723; G06K 19/0776; G08B 13/2402; G08B 13/2417; G08B 21/0275
See application file for complete search history.

(56) References Cited

U.S. PATENT DOCUMENTS

| 6,046,683 A * | 4/2000 | Pidwerbetsky ........... G01S 5/04 340/10.32 |
| 7,030,761 B2 * | 4/2006 | Bridgelall ................. G01S 5/14 340/538.11 |

(Continued)

FOREIGN PATENT DOCUMENTS

| WO | 2010/105633 A1 | 9/2010 |
| WO | 2012/155343 A1 | 11/2012 |

OTHER PUBLICATIONS

May 25, 2016 Office Action issued in British Patent Application No. GB1521854.8.

*Primary Examiner* — Brian Miller
(74) *Attorney, Agent, or Firm* — Oliff PLC; R. Brian Drozd

(57) ABSTRACT

A system, method and computer readable medium are provided. One system includes a transmit antenna, at least one receive antenna, and an imager configured to acquire one or more images in a scanning area having one or more radio frequency identifier (RFID) tags including an RFID tag of interest. The system further includes a controller configured to operate the transmit antenna and the at least one receive antenna to acquire location information from the RFID tags, wherein the controller is further configured to operate the imager to acquire the images while the location information is acquired. The system includes a processor configured to correlate the acquired location information and the one or more images to determine an image corresponding to a location of the RFID tag of interest. The system additionally includes a display configured to display the image corresponding to the location of the RFID tag of interest.

20 Claims, 6 Drawing Sheets

(56) References Cited

U.S. PATENT DOCUMENTS

| | | | |
|---|---|---|---|
| 7,119,738 B2 * | 10/2006 | Bridgelall | G01S 13/32 340/572.1 |
| 7,405,662 B2 * | 7/2008 | Steinke | G06K 7/0008 340/572.1 |
| 7,423,516 B2 * | 9/2008 | Overhultz | G01S 5/0252 340/10.1 |
| 7,786,865 B2 * | 8/2010 | Park | G06K 7/0008 340/572.1 |
| 8,248,210 B2 * | 8/2012 | Nikitin | G01S 5/0247 340/10.1 |
| 8,294,554 B2 * | 10/2012 | Shoarinejad | G01S 7/003 340/10.1 |
| 8,374,230 B2 * | 2/2013 | Yoshihara | H04B 17/23 375/224 |
| 8,760,520 B2 * | 6/2014 | Levin | G06Q 10/06 340/10.1 |
| 9,041,518 B2 * | 5/2015 | Vargas | G06K 7/10386 235/440 |
| 9,081,994 B2 * | 7/2015 | Zumsteg | G06K 7/10099 |
| 9,176,215 B2 * | 11/2015 | Nikitin | G01S 5/02 |
| 9,443,119 B2 * | 9/2016 | Zumsteg | G06K 7/10079 |
| 9,619,683 B2 * | 4/2017 | Zumsteg | G06K 7/10366 |
| 2004/0118916 A1 | 6/2004 | He | |
| 2005/0285742 A1 * | 12/2005 | Charych | G01S 3/20 340/572.1 |
| 2007/0290802 A1 * | 12/2007 | Batra | G06K 7/0008 340/10.1 |
| 2009/0037244 A1 | 2/2009 | Pemberton | |
| 2009/0231107 A1 * | 9/2009 | Sato | H04B 5/0062 340/10.3 |
| 2010/0161435 A1 * | 6/2010 | Shimizu | G06Q 20/203 705/22 |
| 2010/0289624 A1 * | 11/2010 | Nakamura | G01S 3/046 340/10.3 |
| 2012/0223813 A1 | 9/2012 | Baxter et al. | |
| 2013/0154809 A1 * | 6/2013 | Subramanian | G01S 13/878 340/10.42 |
| 2013/0194077 A1 * | 8/2013 | Vargas | G06K 7/10386 340/10.6 |
| 2015/0355308 A1 * | 12/2015 | Ishida | H04W 4/00 455/456.1 |

* cited by examiner

SYSTEMS AND METHODS FOR DISPLAYING LOCATION INFORMATION FOR RFID TAGS

BACKGROUND

Handheld or mobile computers are widely used, such as in different field mobility environments. For example, these computing devices may be used by mobile field service and transportation workers to allow different types of mobile operations, such as in-field computing, radio frequency identifier (RFID) scanning, barcode scanning, and communication with remote external devices, among others.

For RFID scanning, RFID scanners may use one or more RFID methods for different applications, including for smart cards, supporting maintenance tasks, identification badges, tracking objects in manufacturing, retail inventory management, etc. An RFID tag can be attached, e.g., to an inventory object. An RFID apparatus can be configured with an RFID reading device including one or more antennas to read the memory of an RFID tag attached to an inventory object.

The RFID apparatus may be a handheld device with integrated RFID reading capabilities that can read RFID tags from a range of distances, such as during a retail floor inventory operation. However, one may not know whether all physical structures such as retail floor fixtures (and by extension, all items with attached RFID tags) in a given department have been inventoried and the subsequent determination of the location of a particular RFID tagged inventory item can be difficult. For example, it can be quite time consuming for the user of an RFID apparatus to perform retail floor inventory location operations because conventional RFID devices may only be capable of providing a coarse or approximate location of a particular RFID tag coupled with an item, and in some instances cannot provide even coarse location information.

Thus, while one benefit of RFID, compared with traditional barcode scanning, is that the user does not need line of sight to the tag in order to collect data, the absence of the one to one correspondence that the line of sight gives the user creates a problem when the user is searching for a particular tagged item. Moreover, as RFID tags become more ubiquitous, it is becoming more difficult to know what tags are actually being read.

Thus, there is a need for a way to efficiently and accurately guide a user to a RFID tag of interest and/or to record image information for storage and later use relating to the RFID tag.

SUMMARY

To overcome these and other challenges, aspects of broad inventive principles are disclosed herein.

In one embodiment, a system is provided that includes a transmit antenna, at least one receive antenna, and an imager configured to acquire one or more images in a scanning area having one or more radio frequency identifier (RFID) tags including an RFID tag of interest. The system further includes a controller configured to operate the transmit antenna and the at least one receive antenna to acquire location information from the RFID tags, wherein the controller is further configured to operate the imager to acquire the one or more images in the scanning area while the location information is acquired. The system also includes a processor configured to correlate the acquired location information and the one or more images to determine an image corresponding to a location of the RFID tag of interest. The system additionally includes a display configured to display the image corresponding to the location of the RFID tag of interest.

In another embodiment, a method for determining a location of a radio frequency identifier (RFID) tag is provided that includes receiving a user input to search for an RFID tag of interest, acquiring, in a scanning area, selective location information for a plurality of RFID tags from a RFID apparatus, and acquiring one or more images in the scanning area while the location information is acquired. The method also includes correlating with a processor the acquired location information and the one or more images to determine an image corresponding to a location of the RFID tag of interest and displaying the image corresponding to the location of the RFID tag of interest.

In another embodiment, a computer-readable storage medium includes executable instructions capable of configuring one or more processors for receiving a user input to search for an RFID tag of interest, acquiring, in a scanning area, selective location information for a plurality of RFID tags from an RFID apparatus, and acquiring one or more images in the scanning area while the location information is acquired. The computer-readable storage medium includes further executable instructions capable of configuring the one or more processors for correlating the acquired location information and the one or more images to determine an image corresponding to a location of the RFID tag of interest and displaying the image corresponding to the location of the RFID tag of interest.

DETAILED DESCRIPTION

Figure 1:
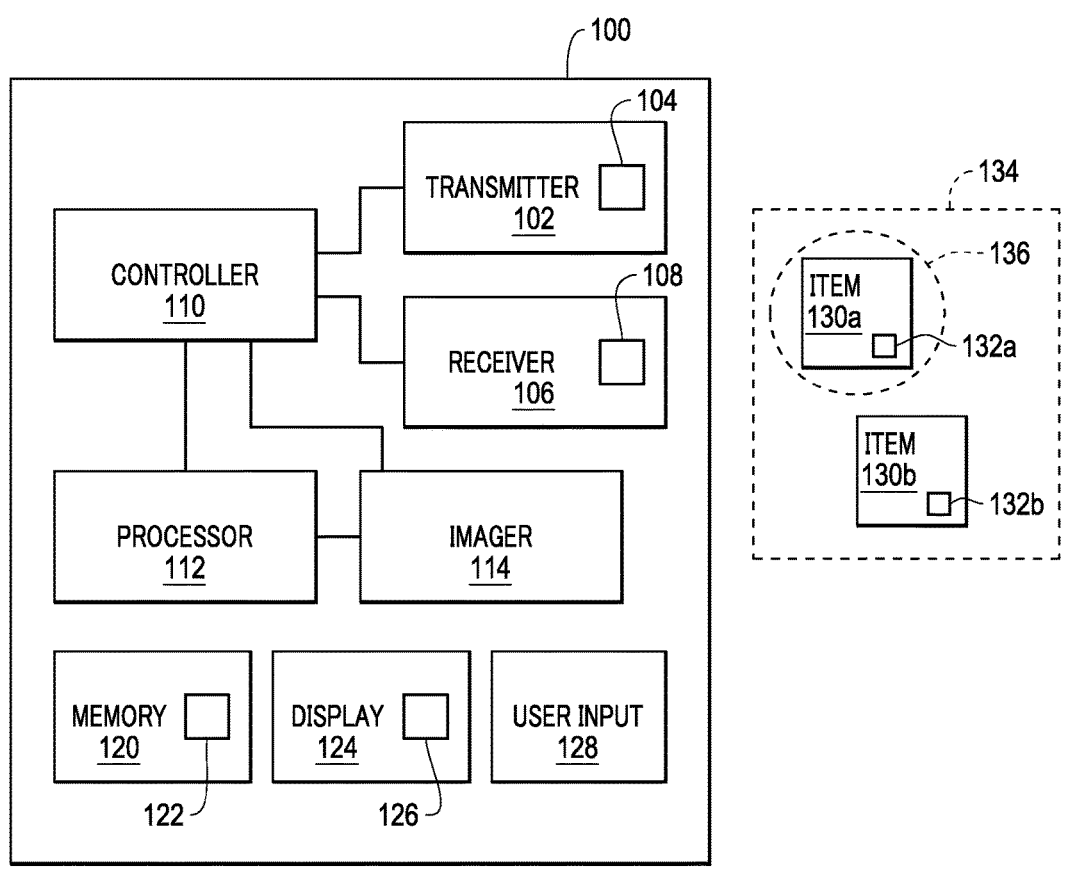
FIG. 1 is a block diagram illustrating a RFID tag location system according to one embodiment.

The exemplary embodiments described herein provide detail for illustrative purposes and are subject to many variations in structure and design. It should be appreciated, however, that the embodiments are not limited to a particularly disclosed embodiment shown or described. It is understood that various omissions and substitutions of equivalents are contemplated as circumstances may suggest or render expedient, but these are intended to cover the application or implementation without departing from the spirit or scope of the claims.

Also, it is to be understood that the phraseology and terminology used herein is for the purpose of description and should not be regarded as limiting. The terms "a," "an," and "the" herein do not denote a limitation of quantity, but rather denote the presence of at least one of the referenced object.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, as will be appreciated by one skilled in the art, aspects of the present disclosure may be embodied as a system, method, or computer program product. Accordingly, aspects of various embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." In addition, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM) or similar DVD-ROM and BD-ROM, an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

At least some of the present disclosure is described below with reference to flowchart illustrations and/or block diagrams of methods, apparatus (systems) and computer program products according to embodiments described herein. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Handheld or portable computing devices can be used in many different applications. Accordingly, while various embodiments may be described in connection with identifying items or inventory in a particular environment, the various embodiments are not so limited. For example, various embodiments may be used to identify or locate different types of RFID tags or items to which RFID tags are coupled.

When RFID scanning is performed, difficulties may arise when searching for a particular tagged item because RFID does not require line of sight reading. Accordingly, it may be difficult and time consuming to locate a particular item coupled with an inventoried RFID tag, resulting in frustration to the user.

Some embodiments of the present application describe systems and methods to facilitate locating a particular RFID tag, such as locating an RFID tagged item with a handheld device. In one embodiment, an RFID tag location system is configured to guide a user to an RFID tag of interest or to record image information associated with the location of the RFID tag to facilitate guiding the user to the RFID tag.

In some embodiments, a handheld UHF RFID reader system with a camera or other imager and an RFID reader capable of measuring backscattered signal phase are configured to provide tag location information (e.g., visual tag guidance location information). For example, backscattered phase data and image data are collected as the handheld RFID scanner is moved by a user (e.g., waved around) as the user is searching for a particular tag or tags of interest. The collected data is processed and the user is presented in real-time, near real-time or at a later time, location information for the one or more tags, such as an image of the approximate location of the tag. As should be appreciated, the location information displayed to a user can facilitate more efficient location of items coupled with the one or more tags. For example, a scan can be performed on an initial area, such as by waving the RFID scanner horizontally and then vertically to more accurately locate or pinpoint and display to the user a more precise location of the tag in the image.

It should be understood that while various embodiments may be described in connection with a particular RFID device or scanning for a particular type of tag, the various embodiments are not limited to such devices or scanning and may be used with different devices for performing scanning for different types of tags. Additionally, various embodiments may be operate in different settings or may be used for different applications. For example, one or more embodiments may be used for tag inventory to store images of tag locations when a determination is made that the RFID scanner (such as RFID handheld) has crossed or passed by the tag (e.g., RFID tag passed in front of the scanner). In this mode of operation, a priori knowledge of the tag identification is not needed and images of the tags that are read can be stored with the location for later use.

It should be noted that the RFID tag location system and various components are referred to herein for ease of illustration. However, it should be understood that the system and various components may be configured as any type of RFID scanning system for locating RFID tags in different locations and orientations.

One embodiment of a RFID tag location system 100 is shown in FIG. 1. The system 100 may be embodied as or form part of a handheld RFID scanner. For example, the system 100 may be embodied or form part of a mobile computing device, such as an Intermec mobile computer available from Honeywell Scanning and Mobility.

The RFID tag location system 100 can comprise a transmitter 102 having one or more transmit antennas 104 and a receiver 106 having one or more receive antennas 108. It should be noted that although one transmit antenna 104 and one receive antenna 108 are illustrated, the system 100 can comprise additional transmit or receive antennas 104, 108. In one or more embodiments, a plurality of receive antennas 108 are arranged in an array, which may be symmetrical or asymmetrical. For example, the receive antennas 108 may be arranged in a generally rectangular array configuration or aligned to form different sized and shaped arrays as desired or needed, such as based on the RFID tags to be scanned.

The transmitter 102 and receiver 106 are selectively activated (e.g., selectively turned on and off) to scan a region of interest 134 to acquire RFID tag location information, which then may be used to guide the user to locate the RFID tags as described in more detail herein. The transmitting and receiving may be performed using RFID scanning techniques in the art.

Using the acquired location information, which is associated with acquired image information, various embodiments facilitate guiding a user to locate an RFID tag. For example, using various embodiments, the location of one or more RFID tags may be more precisely determined and provided to a user to guide the user towards the RFID tag.

The system 100 can also comprise a controller 110 coupled to the transmitter 102 and receiver 106. It should be noted that any type of communicative or operative coupling may be used, such as any type of wireless or wired communication. The controller 110 is configured to control the operation of the transmitter 102 and receiver 106, such as to control the transmissions by the transmit antenna 104 and the reception by the receive antennas 108. In one embodiment, the controller 110 is a transmit and receive controller configured to control the radio-frequency (RF) pulses sent to the transmit antenna 102 and the communication of signals received by the receive antennas 108. However, as described in more detail herein, the controller is also configured to control other components of the system 100.

The system 100 can further comprise a processor 112 coupled to the controller 110. As described in more detail herein, the processor 112 can control the operation of the controller 110 to transmit and receive as desired or needed. The processor 112 is also configured in various embodiments to process received signal information, such as backscattered phase information used to determine the location of one or more RFID tags as described herein, for example, from a relative distance measurement determined from the backscattered phase information. For example, in one or more embodiments, the position, orientation, size and/or movement of RFID tags, which may be coupled to an object or item, is determined using the measurement of the phase of the tag responses at the receive antenna(s) 108 and phase differentials as a function of distance, frequency, and time as the basis of the spatial identification. Although different RFID location determination methods may be used, one or more embodiments use the methods described in U.S. Pat. No. 8,248,210, the entire disclosure of which is incorporated by reference herein.

The device 100 can further comprise an imager 114, which can be any type of image capture device, such as a camera that is configured to acquire images of a region of interest 134, which in some embodiments corresponds to a scanning area of the system 100. For example, the region of interest 134 may be a portion of a storage facility having a large number of RFID tagged objects or items. The illustrated embodiment shows two items 130a, 130b that have a corresponding RFID tag 132a, 132b coupled thereto for simplicity. However, it should be appreciated that many more tagged items may be located within the region of interest 134. Also, the RFID tag 132 may be affixed directly to the item 130 or a packaging of the item using techniques in the art.

The processor 114 is configured to receive tag response and/or read information including backscattered phase information, which in some embodiments includes receiving selectively read tag responses and logging the timestamp of each read response in connection with the backscattered phase information. Additionally, the imager 114 is acquires image information (e.g., acquires still or video images), which may be performed, for example, periodically or continuously while the system 100 is scanning for the one or more RFID tags 132. As discussed in more detail herein, the system 100 may be used to guide or suggest to a user a handheld position for acquiring the information, which is used in combination to facilitate locating the one or more items 130.

Referring again to the system 100, a memory 120, which may be any type of electronic storage device, can be coupled to the processor 112 (or form part of the processor 112). The processor 112 may access the memory 112 to obtain stored image information 122 that is correlated, such as with time-stamping, with acquired phase information for the RFID tags 130 and used to aid or facilitate locating the RFID tags 132, such as by presenting the user with location or direction information to help more easily identify the physical location of the RFID tags 132.

The system 100 can also comprise a display 124 and user input device 128 coupled to the processor 112 to allow user interaction with the system 100. For example, the display 124 can allow visual guidance to locate one or more of the items 132 by displaying location information 126 of the RFID tags 132 associated with the items 132. For example, an image of a portion of the region of interest 134 that has been determined through correlating the backscattered phase information and time-stamped image information to include one or more of the RFID tags 132 may be displayed on the display 124. In the illustrated embodiment, the location information 126 displayed on the display 124 includes an image of an area 136 within the region of interest 134 that includes or likely includes the RFID tags 132 corresponding to a requested search from a user for a particular item 130 or RFID tag 132 received as one or more user inputs at the user input device 124 (e.g., keyboard, mouse, touchpad, etc.). As described in more detail herein, in some embodiments, using the backscattered phase information, the RFID 132 located closest to the system 100 may be determined in correlation with a time-stamped image file stored in the memory 120 in which the item 132 of interest (item searched for by the user) is most likely located.

It should be noted that in some embodiments, the display 122 and user input device 124 may be integrated, such as in a touchscreen display device.

While FIG. 1 illustrates a particular connection arrangement of the various components, a skilled artisan would appreciate the fact that other connection arrangements may be made that are within the scope of this disclosure. Additionally, the various components may be housed within the same or different physical units and the separation of components within FIG. 1 is merely for illustration.

The system 100 can also comprise one or more communication subsystems to allow communication with external devices, such as networks, printers, etc. Thus, additional components may form part of or communicate with the system 100.

Figures 2A, 2B:
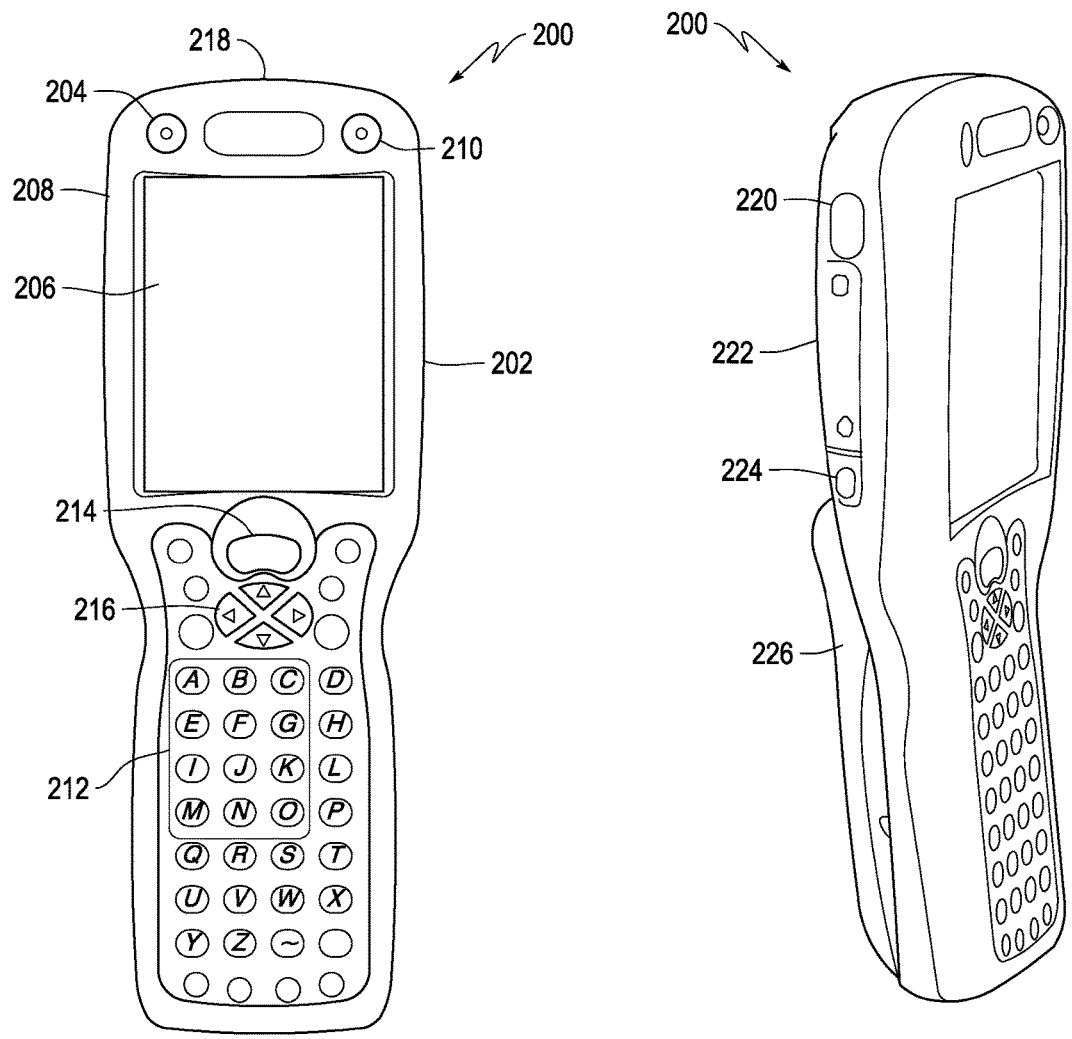
FIGS. 2A, 2B and 2C schematically illustrate an RFID apparatus according to one embodiment.

In some embodiments, the system 100 may be embodied as part of a RFID apparatus 200 is shown in FIGS. 2A (front panel view), 2B (oblique panel view) and 2C (bottom panel view). The RFID apparatus 200 can comprise a housing 202 within which other components of RFID reader 200 can be disposed. An LCD screen display with touch screen sensor 206 can be disposed on a front panel 208. Also disposed on the front panel 208 can be an operation LED 204, a scan LED 210, and keyboard 212 including a scan key 214 and navigation keys 216. An imaging window 218 can be disposed on the top panel of the housing 202. Disposed on the side panel (best viewed in FIG. 2B) can be an infrared communication port 220, an access door to a secure digital (SD) memory interface 222, an audio jack 224, and a hand strap 226. Disposed on the bottom panel (best viewed in FIG. 1C) can be a multi-pin mechanical connector 228 and a hand strap clip 230.

In various embodiments, the imaging window 218 allows an imaging system, such as the imager 114 (shown in FIG. 1) within the housing 202 to be behind the imaging window 218 for protection to have a field of view in front of the RFID apparatus 200. In some embodiments, an illuminator (not shown) may also be disposed within housing 202 behind the protective imaging window 218 in a cooperative manner with the camera system. In one embodiment, the imaging window 218 may include a fisheye lens or other lens to provide a panoramic or wider view to ensure that a camera can capture images of, for example, the region of interest 134 (shown in FIG. 1).

Also disposed on the bottom panel (or alternatively on the top panel) can be an RFID antenna housing and an RFID read device (which may can include the transmitter 102 and receiver 106 shown in FIG. 1) within the housing 202.

While FIGS. 1A-1C illustrate one embodiment of a handheld housing, a skilled artisan would appreciate that other types and form factors of terminal housings are within the scope of this disclosure.

Figure 3:
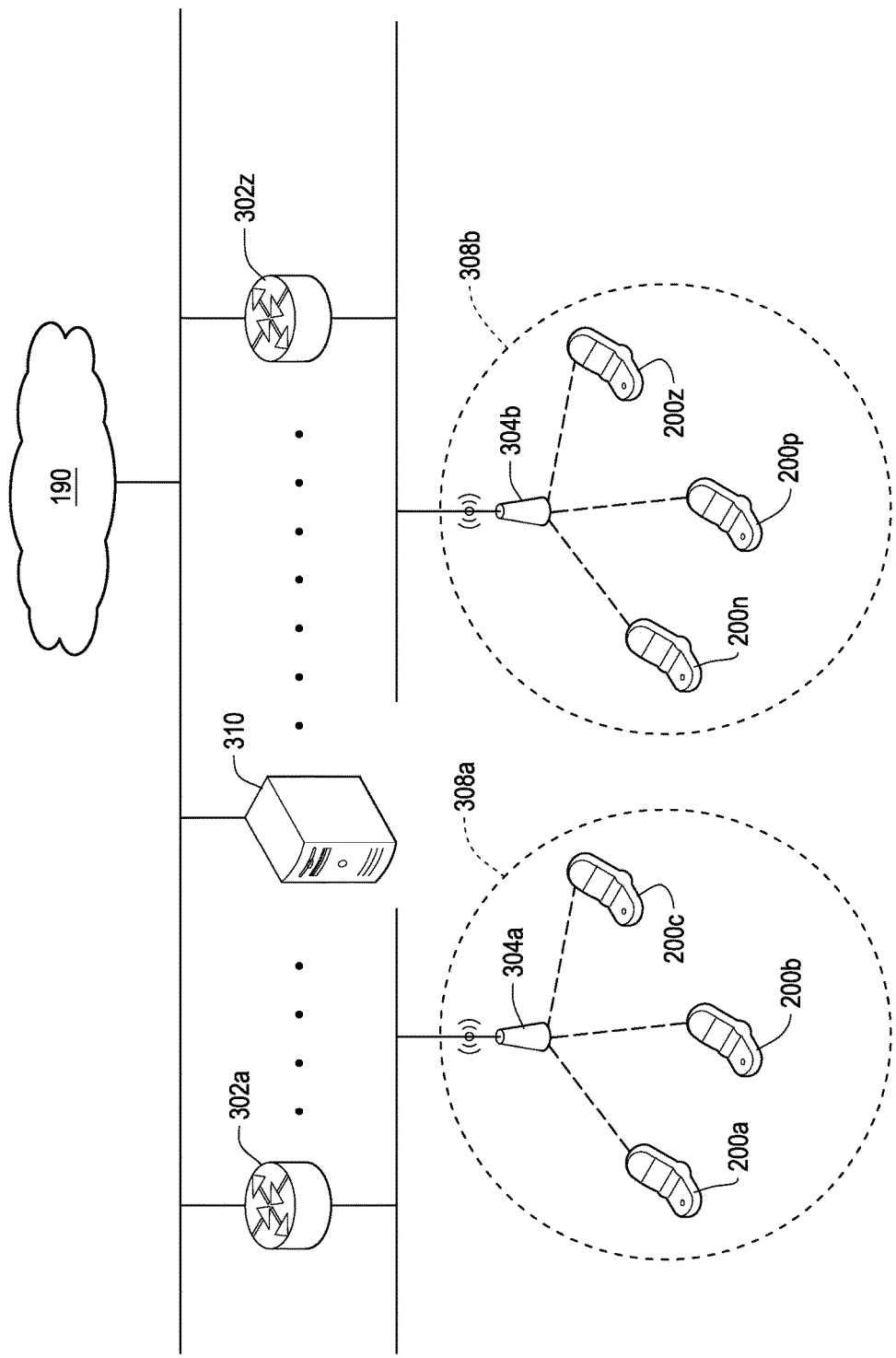
FIG. 3 is a block diagram of a network-level layout of a data collection system utilizing one or more RFID apparatus according to one embodiment.

In some embodiments, the system 100 and/or RFID apparatus 200 can be incorporated in a data collection system. The data collection system, schematically shown in FIG. 3, can include a plurality of routers 302a-302z, a plurality of access points 304a-304, and a plurality of RFID apparatus 200a-200z in communication with a plurality of interconnected networks 308a-308z. In one embodiment, the plurality of networks 308a-308z can include at least one wireless communication network. In one or more embodiments, one or more of the RFID apparatus 200 can comprise a communication interface which can be used by the RFID apparatus 200 to connect to the one or more of the networks 308a-308z. In one embodiment, the communication interface can be provided by a wireless communication interface.

One or more of the RFID apparatus 200 can establish communication with a host computer 310. In one embodiment, network frames can be exchanged by the RFID apparatus 200 and the host computer 310 via one or more routers 302, base stations, and other infrastructure elements. In another embodiment, the host computer 310 can communicate with the RFID apparatus 200 via a network 308, such as a local area network (LAN). In yet another embodiment, the host computer 310 can communicate with the RFID apparatus 200 via a network 308, such as a wide area network (WAN). A skilled artisan should appreciate that other methods of providing interconnectivity between the RFID apparatus 200 and the host computer 310 relying upon LANs, WANs, virtual private networks (VPNs), and/or other types of network are within the scope of this disclosure.

In one embodiment, the communications between the RFID apparatus 200 and the host computer 310 can comprise a series of HTTP requests and responses transmitted over one or more TCP connections. In one embodiment, the communications between the RFID apparatus 200 and the host computer 310 can comprise VoIP traffic transmitted over one or more TCP and/or UDP ports. A skilled artisan should appreciate that using other transport and application level protocols is within the scope of this disclosure.

Figure 4:
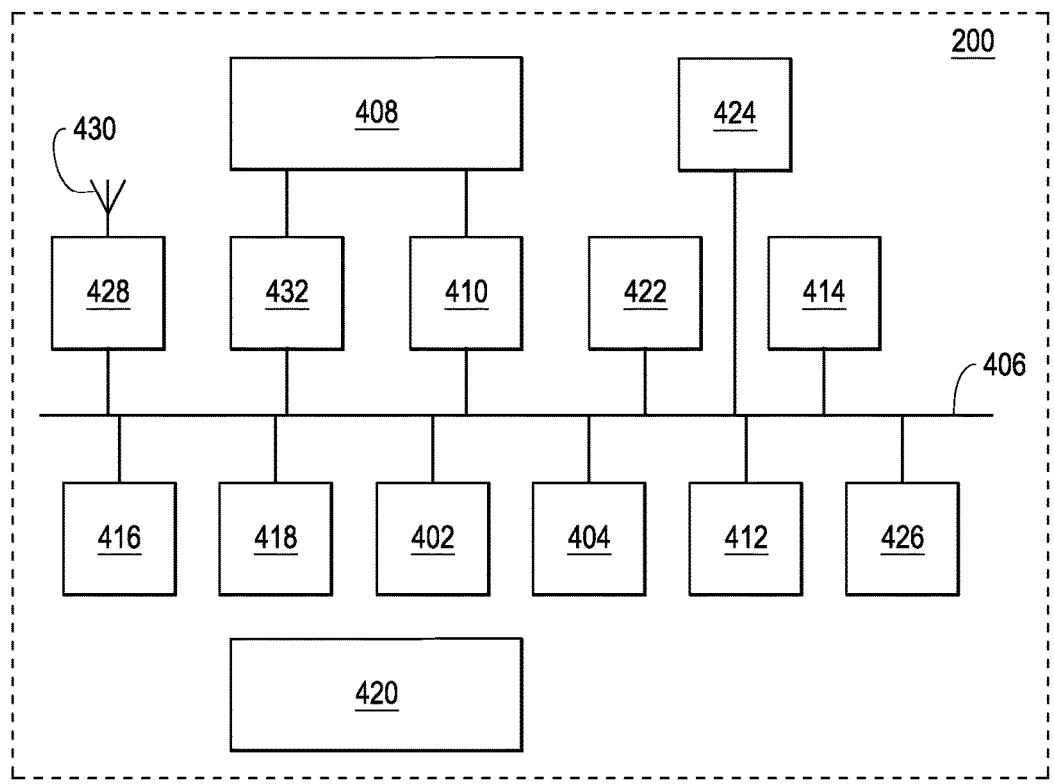
FIG. 4 is a block diagram of a component-level layout of an RFID apparatus according to one embodiment.

A component-level diagram of one embodiment of an RFID apparatus 200 will now be described with reference to FIG. 4. The RFID apparatus 200 can comprise at least one microprocessor 402 and a memory 404 (which may be embodied as the memory 120 shown in FIG. 1), both coupled to a system bus 406. The microprocessor 402 can be provided by a general purpose microprocessor or by a specialized microprocessor (e.g., an ASIC). In one embodiment, the RFID apparatus 200 can comprise a single microprocessor which may be referred to as a central processing unit (CPU). In another embodiment, the RFID apparatus 200 can comprise two or more microprocessors, for example, a CPU providing some or most of the RFID apparatus functionality and a specialized microprocessor performing some specific functionality (e.g., tag location determination as described herein). A skilled artisan should appreciate that other schemes of processing tasks distributed among two or more microprocessors are within the scope of this disclosure. The memory 404 can comprise one or more types of memory, including but not limited to random-access-memory (RAM), non-volatile RAM (NVRAM), etc.

The RFID apparatus 200 can further comprise a communication interface 408 communicatively coupled to the system bus 406. In one embodiment, the communication interface 408 may be by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

A module 410 is an additional modular component that can be replaced with upgraded or expanded modules and is coupled between the system bus 308 and the communication interface 408. This module 410 is compatible with, for example, auxiliary hard drives (including flash memory), RAM, communication interfaces, etc.

The RFID apparatus 200 can further comprise a camera system 412 (which may be embodied as the imager 114 in FIG. 1) and an image interpretation and processing module 414. In one embodiment, the image interpretation and processing module 414 receives image data from the camera system 412 and processes the information for use in determining the location of one or more RFID tags and presenting an image corresponding to that determined location. In another embodiment, the processing module 414, which is coupled to the system bus 406, exchanges data and control information with the microprocessor 402 or the memory 404.

The RFID apparatus 200 can further comprise a keyboard interface 416 and a display adapter 418, both also coupled to the system bus 406. The RFID apparatus 200 can further comprise a battery 420. In one embodiment, the battery 420 may be a replaceable or rechargeable battery pack.

The RFID apparatus 200 can further comprise a GPS receiver 422 to facilitate providing location information relating to the RFID apparatus 200. The RFID apparatus 200 can also comprise at least one connector 424 configured to receive, for example, a subscriber identity module (SIM) card. The RFID apparatus 200 can further comprise one or more illuminating devices 426, provided by, for example, but not limited to, a laser or light emitting diode (LED). The RFID apparatus 200 still further can comprise one or more encoded indicia reading (EIR) devices 428 provided by, for example, but not limited to, an RFID reading device, a bar code reading device, or a card reading device. In one embodiment, the RFID apparatus 200 can be configured to receive RFID scanning information, such as responses received from activated RFID tags.

It should be appreciated that devices that read bar codes, read RFID tags, or read cards bearing encoded information may read more than one of these categories while remaining within the scope of this disclosure. For example, a device that reads bar codes may include a card reader, and/or RFID reader; a device that reads RFID tags may also be able to read bar codes and/or cards; and a device that reads cards may be able to also read bar codes and/or RFID. For further clarity, the primary function of a device may involve any of these functions in order to be considered such a device; for example, a cellular telephone, smartphone, or PDA that is capable of reading bar codes or RFID tags is a device that reads bar codes or RFID tags for purposes of this disclosure.

The EIR device 428 may be configured to read RFID tags and acquire different types of information, for example, backscattered phase information as described herein and communicate such information to the microprocessor 402 or memory 404. In another embodiment, the EIR device 428 can be configured to adjust the RFID transmit power level. Signals transmitted from or received by the RFID apparatus 200 may be provided via an antenna 430.

In some embodiments, the RFID apparatus 200 includes an inertial measurement unit (IMU) 432 (containing one or more of a 3-axis accelerometer, a 3-axis magnetometer and a 3-axis gyroscope sensor which may provide orientation information) utilized to record the position of the RFID apparatus 200 in three dimensional space. The IMU 432 also assists the RFID apparatus 200 in determining the orientation thereof, during the process of scanning for RFID tags as the RFID apparatus 200 moves through space. The orientation of the RFID apparatus 200 includes the position of the RFID apparatus 200 itself relative to a physical structure.

The RFID apparatus 200 can be at a given position, for example ($x_1$, $y_1$, $z_1$) but the orientation of the RFID apparatus at this position may vary. The RFID apparatus 200 may be held upright at a position to define one orientation, but the RFID apparatus 200 may also be moved to an angle relative to any direction in three dimensional space (while the position of the RFID apparatus 200 is unchanged). This movement represents a change in orientation. In one embodiment, during the scanning process, both the position and the orientation of the RFID apparatus 200 are calculated by the camera system 412 and/or the IMU 432 and the resultant data is stored and may be used to facilitate locating an item 130 (shown in FIG. 1) or positioning the RFID apparatus 200 as described in more detail herein.

Figure 2C:
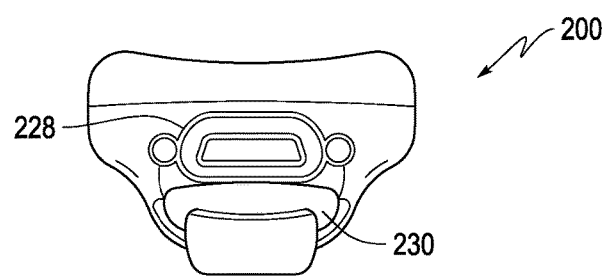

As described herein, various embodiments allow for the determination and display of location information to facilitate locating an RFID tag 132 (shown in FIG. 1). For example, a user may enter a desired item 130 (shown in FIG. 1) to be located and a scanning process is thereafter automatically initiated or initiated by the front panel scan key 214 (shown in FIG. 2). During scanning, image information is acquired by the camera system 412 and may be displayed in real-time or subsequent to scanning to facilitate locating an item 130 (shown in FIG. 1) based on the identification (e.g., ID number) of an RFID tag 132 (shown in FIG. 1) that is read by the EIR device 428, which may be facilitated by using information relating to the position or orientation of the RFID apparatus 200 (e.g., guide a user to position the RFID apparatus 200 for proper scanning)

Figure 5:
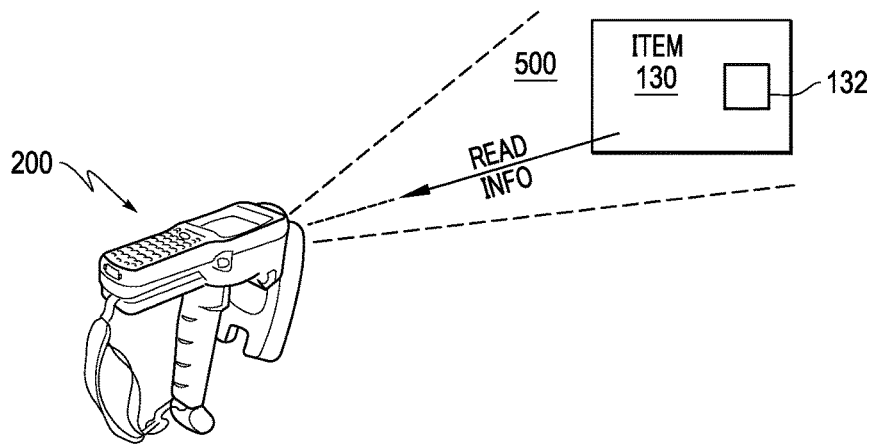
FIG. 5 depicts a scanning operation according to one embodiment.
Figure 6:
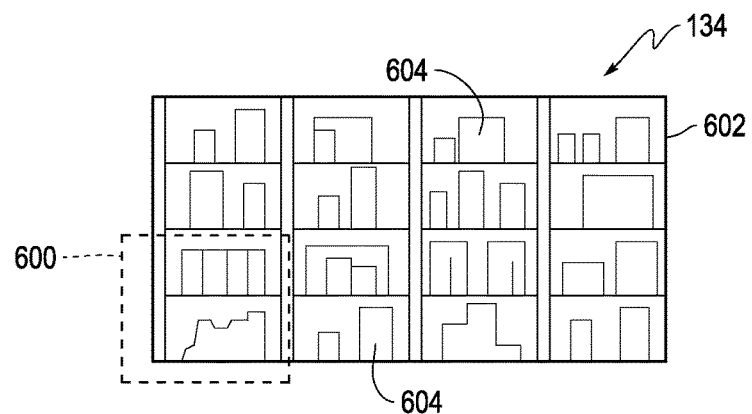
FIG. 6 depicts a scanning area according to one embodiment.
Figure 7:
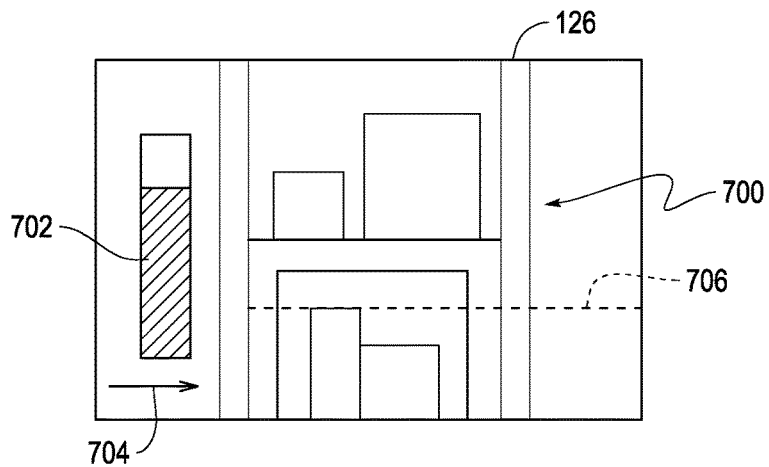
FIG. 7 depicts a display corresponding to a located RFID tag according to one embodiment.

In various embodiments, the RFID apparatus 200 is moved in one or more directions to scan the region of interest 134 (shown in FIG. 1) to perform a search for one or more items 130 using backscattered phase information from one or more RFID tags 132. For example, as illustrated in FIGS. 5-7, a field of view 500 of the RFID apparatus 200 is scanned within the region of interest 134 to locate a particular item 130. As can be seen in FIG. 6, which illustrates a displayed region 600 (illustrated by the dashed box) corresponding to the field of view 500, only a portion of the region of interest 134 is within the field of view 500. In this example, the region of interest 134 includes a warehouse storage area including shelving on which many items are located. Accordingly, the RFID apparatus 200 is moved in order to locate one or more items of interest (e.g., one or more boxes 604 having an RFID tag 132 (shown in FIGS. 1 and 5) coupled thereto).

In the illustrated embodiment, the RFID apparatus 200 is a handheld RFID reader that is capable or capturing images of the region of interest 134, as well as measuring backscattered signal phase, which are used to provide RFID tag location information. For example, as the RFID apparatus 200 is moved across the region of interest 134 (e.g., waved horizontally by a user to search for an item, such as a box 604), backscattered phase data and image data are collected, illustrated as read information in FIG. 5.

The collected data is processed to determine a phase value from every successful read by the RFID apparatus 200. In one embodiment, each successful read is unwrapped to produce a relative distance measurement of the tag. The unwrapping of the phase data may be performed, for example, as described in U.S. Pat. No. 8,248,210. However, it should be noted that other methods in the art for determining the location of RFID tags may be used in combination with one or more embodiments described herein. Using the unwrapped phase data in combination with images acquired during the scanning process, the location of one or more RFID tags 132 may be presented to a user, such as on the display 126 (shown in FIGS. 1 and 7).

In some embodiments, an initial scan may be performed by moving the RFID apparatus 200 in one or more horizontal planes across the region of interest 134. The collected data (include backscattered phase data and image data) is processed such that a user is presented with an image 700 of the approximate location of the RFID tag 132 of interest, such as for a desired item 130 having a corresponding RFID tag 132 entered by a user. As can be seen in FIG. 7, the image 700 shows a portion of the region of interest 134 in which the RFID tag 132 was scanned. It should be noted that the mage 700 may be displayed in real-time, near real-time or after the scan is performed. If displayed after scanning, the user will be able to identify the items 130 in the image 700, such as from a visual inspection of the items 130 or portion of the storage area in the image 700 (which may also include identifying indicia on the packages or shelving). If the image 700 is displayed during scanning, a distance indicator 702 may be displayed showing a current proximity to the RFID tag 132. For example, in the illustrated embodiment, the higher the indicator bar, the closer the scan is to the RFID tag 132.

It should be noted that in some embodiments, information from the IMU 432 is used to provide guidance information 704 to the user. For example, in the illustrated embodiment, the guidance information 704 is an arrow suggesting a realignment position of the RFID apparatus 200 to obtain improved scanning, such as to maintain the RFID apparatus 200 in a substantially vertical position while being moved. An alignment marker 706 (e.g., dashed line) may be displayed to facilitate proper motion of the RFID apparatus 200.

It also should be noted that the initial scan may be refined, for example, by scanning in vertical planes after a general location of the RFID tag 132 is presented to the user. For example, in larger areas, it may be more expeditious to first scan horizontally to determine a coarse location of the RFID tag 132 and then perform a vertical scan to provide a more specific or pinpointed location of the RFID tag 132, such as to provide a more localized or precise location of the RFID tag 132 and displayed to the user similar to the display 700.

Thus, in various embodiments, the unwrapped backscattered phase information over time is used as an indicator of the relative movement between the RFID apparatus 200 and the RFID tag 132. In various embodiments, where there is a trend that the unwrapped backscattered phase is decreasing, a determination is made that the distance between the RFID apparatus 200 and the RFID tag 132 is decreasing. Similarly, when the unwrapped backscattered phase is increasing, a determination is made that the distance between the RFID apparatus 200 and the RFID tag 132 is also increasing. In some embodiments, the unwrapped backscattered phase information is processed while scanning to provide real-time feedback of the relative location of the RFID tag 132.

Figure 8:
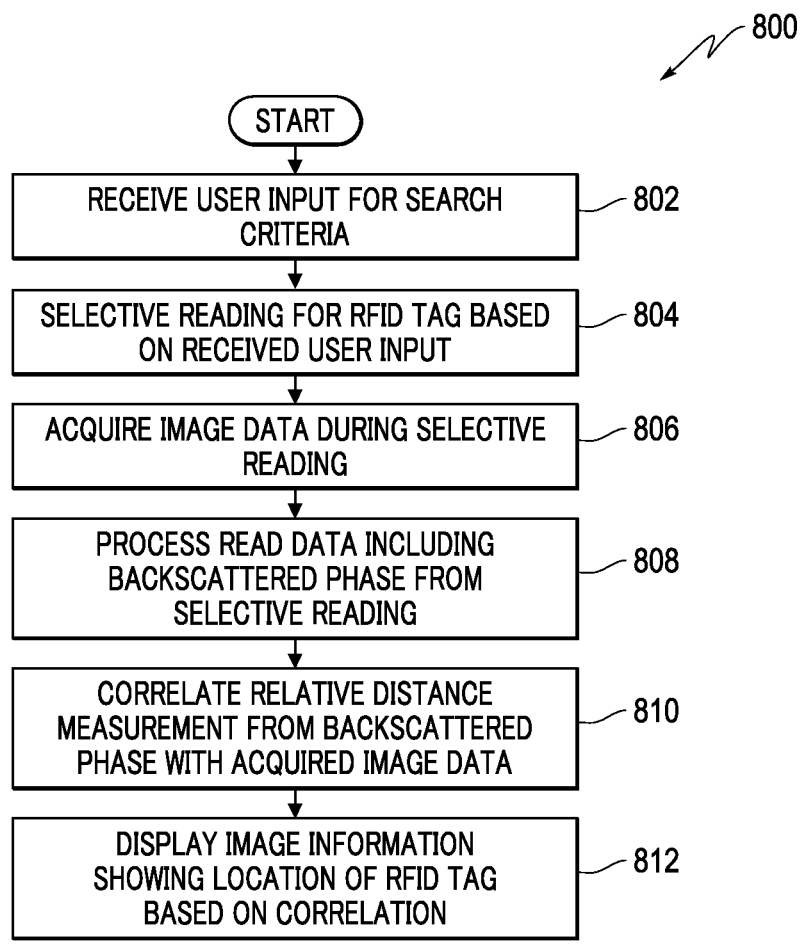
FIG. 8 illustrates a method for determining a location of a RFID tag according to one embodiment.

One or more embodiments include a method 800 as illustrated in FIG. 8. With reference also to FIGS. 1-7, the method 800 may be implemented or performed using one or more systems described herein, such as the system 100 and/or RFID apparatus 200. It should be noted that the steps of the method 800 may be performed in a different order and some steps may be performed concurrently. Additionally, some steps may be repeated.

The method 800 includes receiving one or more user inputs for search criteria at 802. For example, a user may select an RFID tag 132 or item 130 (coupled with an RFID tag 132) of interest, such as by entering identification information for the RFID tag 132 or item 130.

Using the received input(s), selective reading for the RFID tag 132 is performed at 804, which may include an RFID scanning or reading technique as described herein (or known in the art). Additionally, image data is acquired at 806 during the selective reading for the RFID tag 132. For example, the imager 114 acquires images while the read scan is being performed.

As part of the process during steps 804 and 806, while scanning is performed to read for the RFID tag 132 of interest, the time-stamp of each read is recorded to correlate backscattered phase information with the acquired image data. For example, when scanning is initiated, the imager 114 begins to acquire time-stamped image data of the area being scanned by the RFID apparatus 200.

It should be noted that during the scanning, the user may be instructed on the display 126 to orient the RFID apparatus 200 in a known position (e.g., predefined position) and then move the RFID apparatus 200 in a predetermined motion profile, such as from left to right slowly along a single axis. The display may provide indicators to facilitate maintaining proper alignment and speed during scanning For example, a horizontal line 706 (as shown in FIG. 7) may be displayed corresponding to the single axis and which the user is focused on when moving the RFID apparatus 200. Additionally, sensor information from the IMU 432, such as from an accelerometer or gyroscope may be used to verify or suggest a handheld position of the RFID apparatus 200 for the user.

The method 800 also includes processing the read data including backscattered phase data from the selective reading operation at 808. For example, the phase value from every successful read is unwrapped as described herein, which results in a relative distance measurement to the tag from the RFID apparatus 200. In particular, the unwrapped phase reaches a relative minimum when the RFID apparatus 200 is closest to the RFID tag 132 of interest. Thus, in various embodiments, the unwrapped phase over time is processed to determine the relative minima and the corresponding time-stamp of the relative minima is determined.

The method 800 further includes correlating the relative distance measurement (from the backscattered phase data) with the acquired image data at 810. For example, in various embodiments, the time-stamp of the relative minima is used to find the image from the time-stamped images corresponding to the image acquired when the RFID tag 132 was closest to the RFID apparatus 200. More particularly, the RFID tag 132 or item 130 of interest is likely located in the corresponding time-stamped image file.

The method 800 includes displaying image information at 812 showing the location of the RFID tag 132 based on the correlation. As described herein, an image is shown that identifies the location of the RFID tag 132 and that can facilitate or aid the user in locating the RFID tag 132 or item 130. Also, as discussed herein, different motions may be used to resolve the location of the RFID tag 132, such as performing a vertical scan to further locate the RFID tag 132 in a vertical direction.

Thus, using RFID read information, such as backscattered phase data, the read information may be correlated with acquired image information to allow for the display of the location of an RFID tag.

It should be noted that the system 100 can comprise one or more microprocessors (which may be embodied as the processor 112) and a memory, such as the memory 120, coupled via a system bus. The microprocessor can be provided by a general purpose microprocessor or by a specialized microprocessor (e.g., an ASIC). In one embodiment, the system can comprise a single microprocessor which can be referred to as a central processing unit (CPU). In another embodiment, the system 100 can comprise two or more microprocessors, for example, a CPU providing some or most of the scanning functionality and a specialized microprocessor performing some specific functionality, such as to determine distance information and correlate that information with the acquired image information. A skilled artisan would appreciate the fact that other schemes of processing tasks distribution among two or more microprocessors are within the scope of this disclosure. The memory can comprise one or more types of memory, including but not limited to: random-access-memory (RAM), non-volatile RAM (NVRAM), etc.

It should be noted that, for example, the various embodiments can provide communication using different standards and protocols. For example, the wireless communication can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/IxEV-DO protocol family.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments in the form disclosed. Many modifications and variations will be apparent to those of ordinary skill in the art without departing from the scope and spirit of embodiments of the disclosure. The embodiments were chosen and described in order to best explain the principles of embodiments and practical application, and to enable others of ordinary skill in the art to understand embodiments with various modifications as are suited to the particular use contemplated.

The foregoing descriptions of specific embodiments have been presented for purposes of illustration and description. They are not intended to be exhaustive or to limit the embodiments to the precise forms disclosed, and obviously many modifications and variations are possible in light of the above teaching. The embodiments were chosen and described in order to best explain principles and practical applications thereof, and to thereby enable others skilled in the art to best utilize the various embodiments with various modifications as are suited to the particular use contemplated. It is understood that various omissions and substitutions of equivalents are contemplated as circumstances may suggest or render expedient, but these are intended to cover the application or implementation without departing from the spirit or scope of the claims. The following claims are in no way intended to limit the scope of embodiments to the specific embodiments described herein.

What is claimed is:

1. A system comprising:
a radio frequency identifier (RFID) reader comprising at least one antenna;
an imager configured to acquire images in a scanning area having an RFID tag;
a controller configured to operate the at least one antenna to transmit interrogation signals while the RFID reader is moved to scan portions of the scanning area and, concurrently at each of a plurality of points during such movement, acquire: (1) location information indicating the portion within the scanning area being scanned, (2) a response, including phase, from any RFID tags within the portion of the scanning area being scanned, and (3) an image in the scanning area corresponding to the portion within the scanning area being scanned;
a processor configured to determine a location of the RFID tag within the scanning area based on the phase of the RFID tag response and the acquired location information at each position of the RFID reader during scanning; and
a display configured to display an image being only a portion of the scanning area corresponding to the location of the RFID tag within the scanning area.

2. The system of claim 1, wherein the phase is backscattered phase information for the RFID tag and is related to the location information.

3. The system of claim 2, wherein the processor is configured to unwrap the acquired backscattered phase information and determine a closest location of the RFID tag from a determined relative minima of the unwrapped backscattered phase information.

4. The system of claim 1, wherein processor is further configured to correlate the acquired location information and the images using time-stamped information for the acquired location information and the acquired images.

5. The system of claim 1, wherein the display is configured to display a guidance indicator relating to a scan to acquire the location information.

6. The system of claim 1, wherein the controller is further configured to operate the at least one antenna to acquire backscattered phase information for the RFID tag in both a horizontal movement direction and a vertical movement direction.

7. The system of claim 1, wherein the display is configured to display an indicator instructive of an orientation and predetermined motion profile for acquiring the location information.

8. The system of claim 1, further comprising a handheld housing, wherein the imager is located within the handheld housing.

9. A method for determining a location of a radio frequency identifier (RFID) tag, the method comprising:
   scanning a scanning area for the RFID tag by sequentially scanning only portions of the scanning area;
   acquiring, in only portions of the scanning area being scanned, selective location information for the RFID tag from a RFID apparatus, the location information comprising phase of a response from the RFID tag;
   acquiring an image in the scanning area at each point when the location information is acquired during the scanning;
   determining, by a processor, a location of the RFID tag within the scanning area based on the phase of the RFID tag and the acquired location information at respective positions during scanning;
   displaying an image being only the location within the scanning area corresponding to the location of the RFID tag within the scanning area.

10. The method of claim 9, further comprising controlling with a controller at least one antenna of the RFID apparatus to acquire backscattered phase information for the RFID tag, the backscattered phase information related to the location information.

11. The method of claim 10, further comprising unwrapping with the processor the acquired backscattered phase information and determining a closest location of the RFID tag from a determined relative minima of the unwrapped backscattered phase information.

12. The method of claim 9, further comprising correlating with the processor the acquired location information and the images using time-stamped information for the acquired location information and the acquired one or more images.

13. The method of claim 9, further comprising displaying a guidance indicator relating to a scan for to acquire the location information.

14. The method of claim 9, further comprising controlling with a controller the at least one antenna to acquire backscattered phase information for the RFID tag in both a horizontal movement direction and a vertical movement direction.

15. The method of claim 9, further comprising displaying an indicator instructive of an orientation and predetermined motion profile for acquiring the location information.

16. A non-transitory computer-readable storage medium comprising executable instructions capable of configuring one or more processors for:
   receiving a user input to search for an RFID tag;
   transmitting interrogation signals in a scanning area while the RFID reader is moved to scan different areas within the scanning area;
   concurrently at each of a plurality of points during the movement of the RFID reader, acquiring: (1) location information indicating a location within the scanning area being scanned, (2) a response from the RFID tag including a phase of the response, and (3) an image in the scanning area corresponding to the location within the scanning area being scanned;
   determining a location of the RFID tag within the scanning area based on the phase of the RFID tag response and the acquired location information at each position of the RFID reader during scanning; and
   displaying an image being only a portion of the scanning area corresponding to the location of the RFID tag within the scanning area.

17. The non-transitory computer-readable storage medium of claim 16, in which the executable instructions are further capable of configuring one or more processors to control a transmit antenna and at least one receive antenna of the RFID apparatus to acquire backscattered phase information for the one or more RFID tags, the backscattered phase information related to the location information.

18. The non-transitory computer-readable storage medium of claim 17, in which the executable instructions are further capable of configuring one or more processors to unwrap the acquired backscattered phase information and determine a closest location of the RFID tag from a determined relative minima of the unwrapped backscattered phase information.

19. The non-transitory computer-readable storage medium of claim 16, in which the executable instructions are further capable of configuring one or more processors to correlate the acquired location information and the one or more images using time-stamped information for the acquired location information and the acquired images.

20. The non-transitory computer-readable storage medium of claim 16, in which the executable instructions are further capable of configuring one or more processors to display an indicator instructive of an orientation and predetermined motion profile for acquiring the location information.

* * * * *